(12) United States Patent
Niebling et al.

(10) Patent No.: US 12,026,902 B2
(45) Date of Patent: Jul. 2, 2024

(54) METHOD AND SYSTEM FOR MONITORING A SPATIAL AREA IN A PERSONNEL INTERLOCK

(71) Applicant: Mühlbauer GmbH & Co. KG, Roding (DE)

(72) Inventors: Gerhard Niebling, Regensburg (DE); Ralf Lehmann-Elle, Chemnitz (DE); Deepack Kumar, Roding (DE)

(73) Assignee: Muhlbauer GmbH & Co. KG, Roding (DE)

( * ) Notice: Subject to any disclaimer, the term of this patent is extended or adjusted under 35 U.S.C. 154(b) by 370 days.

(21) Appl. No.: 17/426,098

(22) PCT Filed: Jan. 28, 2020

(86) PCT No.: PCT/EP2020/051965
§ 371 (c)(1),
(2) Date: Jul. 27, 2021

(87) PCT Pub. No.: WO2020/157024
PCT Pub. Date: Aug. 6, 2020

(65) Prior Publication Data
US 2022/0092807 A1     Mar. 24, 2022

(30) Foreign Application Priority Data
Jan. 28, 2019   (DE) ..................... 10 2019 102 051.4

(51) Int. Cl.
*G06T 7/55*    (2017.01)
*G06V 20/52*   (2022.01)
(Continued)

(52) U.S. Cl.
CPC ................ *G06T 7/55* (2017.01); *G06V 20/52* (2022.01); *G06V 40/103* (2022.01); *G07C 9/15* (2020.01);
(Continued)

(58) Field of Classification Search
CPC ............ G06T 7/55; G06T 2207/10028; G06T 2207/20212; G06T 2207/30196;
(Continued)

(56) References Cited

U.S. PATENT DOCUMENTS 6,720,874 B2 *   4/2004   Fufido ................. G08B 13/183
                                                       340/556
8,965,063 B2 *   2/2015   Hanna ................. G06V 40/197
                                                       382/116

OTHER PUBLICATIONS

Dumoulin, Joel, et al., "Unicity: A depth maps database for people detection in security airlocks," 2018 15th EEE International Conference on Advanced Video and Signal Based Surveillance (AVSS), IEEE, Nov. 27, 2018 (Nov. 27, 2018), pp. 1-6 (DOI: 10.1109/AVSS.2018.8639152), 6 p.
(Continued)

*Primary Examiner* — Boubacar Abdou Tchoussou
(74) *Attorney, Agent, or Firm* — Wood Herron & Evans LLP (57) ABSTRACT

A method and a system for monitoring a spatial area in a personnel interlock are provided. Image data are acquired which represent a plurality of depth images of the spatial area which have been acquired simultaneously and from different positions in the area of the personnel interlock, in each case by a respective 3D image sensor arranged at the corresponding position. For each of the depth images, an associated characteristic depth image value is calculated. A total image value is obtained by combining the characteristic depth image values of the various depth images in accordance with a predetermined monotonic combination rule. An estimation result for the probability that more than one person is present in the spatial area is then determined.

16 Claims, 6 Drawing Sheets

(51) Int. Cl.
  *G06V 40/10* (2022.01)
  *G07C 9/15* (2020.01)
  *H04N 7/18* (2006.01)
  *H04N 13/204* (2018.01)
  *H04N 23/90* (2023.01)

(52) U.S. Cl.
  CPC ............ *H04N 7/18* (2013.01); *H04N 13/204* (2018.05); *H04N 23/90* (2023.01); *G06T 2207/10028* (2013.01); *G06T 2207/20212* (2013.01); *G06T 2207/30196* (2013.01); *G06T 2207/30232* (2013.01); *G06T 2207/30242* (2013.01)

(58) Field of Classification Search
  CPC ........... G06T 2207/30232; G06T 2207/30242; G06V 20/52; G06V 40/103; G06V 20/64; G07C 9/15; G07C 9/30; H04N 7/18; H04N 13/204; H04N 23/90
  See application file for complete search history.

(56) References Cited

OTHER PUBLICATIONS

International Searching Authority, Search Report and Written Opinion issued in PCT/EP2020/051965, mailed Jun. 12, 2020, 16 pages.
International Searching Authority, Notification Concerning Submission, Obtention or Transmittal of Priority Document issued in PCT/EP2020/051965, mailed Feb. 28, 2020, 1 page.
International Searching Authority, International Preliminary Report on Patentability issued in PCT/ EP2020/051965, mailed Jun. 8, 2021, 23 pages.
Villamizar, M., et al., "WatchNet: Efficient and Depth-based Network for People Detection in Video Surveillance Systems," 2018 15th IEEE International Conference on Advanced Video and Signal Based Surveillance (AVSS), IEEE, Nov. 27, 2018 (Nov. 27, 2018), pp. 1-6 (DOI: 10.1109/AVSS.2018.8639165), 6 pages.

* cited by examiner

METHOD AND SYSTEM FOR MONITORING A SPATIAL AREA IN A PERSONNEL INTERLOCK

CROSS-REFERENCE TO RELATED APPLICATIONS

This application is a national phase entry of, and claims priority to, International Application No. PCT/EP2020/051965, filed Jan. 28, 2020, which claims priority to German Patent Application No. 10 2019 102 051.4, filed Jan. 28, 2019. The above-mentioned patent applications are incorporated herein by reference in their entireties.

TECHNICAL FIELD

This application relates to a method and a system for the monitoring of a spatial area in a personnel interlock, such as for the monitoring of the separation of persons with respect to the spatial area, as well as a personnel interlock equipped with such a system.

BACKGROUND

Personnel interlocks are used to implement the access control to restricted rooms or areas, for example within the framework of the access control for areas which require tickets, such as for example event sites or train platforms, or for security areas of airports, industrial installations or power plants, or research laboratories. An important aspect of many personnel interlocks, in particular of automated interlocks, is the separation, i.e., the monitoring and ensuring that only one person at a time is processed in the interlock and that one or more other persons do not gain unauthorized passage through the personnel interlock together with the first person (monitoring the separation of persons). In many cases, personnel interlocks have a lockable spatial area in which the processing, in particular the authentication, of a person to be processed through the interlock takes place. In particular, the spatial area can be lockable by one or more doors or pairs of doors, in particular by two doors or pairs of doors, wherein, as a rule, one door or one pair of doors is usually provided as a lockable access and another door or another pair of doors is provided as a lockable exit from the spatial area.

Furthermore, a challenge to be solved in connection with such a monitoring of the separation of persons consists in being able to make a reliable distinction between a single person in the spatial area and a plurality of persons in the spatial area even if, in addition to the one or more persons, there are further objects in the spatial area of the personnel interlock, such as luggage or equipment carried along.

It would therefore be desirable to provide a solution which is as reliable as possible and which, at the same time, is as efficient as possible, for monitoring a spatial area in a personnel interlock, in particular for the purpose of monitoring the separation of persons.

SUMMARY

To address these and other problems with the conventional designs, systems and methods for monitoring a spatial area are provided. A first embodiment of the invention relates to a method, in particular a computer-implemented method, of monitoring a spatial area in a personnel interlock, in particular for the monitoring of the separation of persons with respect to the spatial area. The method comprises: (i) receiving image data which represent a plurality of depth images of the spatial area which have been acquired simultaneously and from different positions in the area of the personnel interlock, in each case by a respective 3D image sensor arranged at the corresponding position, wherein each of the depth images indicates, for each of its pixels, a spatial distance of the object (person or item) or portion of an object imaged thereon from the associated 3D image sensor on the basis of a pixel value assigned thereto; (ii) calculating, for each of the depth images, a characteristic depth image value associated with the respective depth image, on the basis of all of the individual pixel values or on the basis of a subset of the individual pixel values of the respective depth image, in particular by applying an averaging method; (iii) calculating a total image value by combining the characteristic depth image values of the various depth images in accordance with a predetermined monotonic combination rule, which may be a summation or comprise a summation; and (iv) determining an estimation result for the probability that more than one person is present in the spatial area, in dependence upon the result of a comparison of the total image value with at least one predetermined reference total image value.

In the sense of the invention, a "3D image sensor" is intended to be understood to mean an image sensor, in particular a camera device, which is set up to image a spatial area in three spatial dimensions and to produce corresponding image data. Image sensors that provide only a two-dimensional image with additional depth information instead of an entire spatial three-dimensional image representation (often referred to as 2.5D sensors) are also "3D image sensors" within the sense of the invention. In particular, they include stereo cameras or time-of-flight (TOF) cameras or PMD cameras.

In the sense of the invention, a "depth image" is intended to be understood to mean an image in two spatial dimensions, the pixels of which are each assigned a value (pixel value) which indicates a measure of a spatial distance, along a third spatial dimension, of the object (person or item) or portion of an object which is imaged onto the pixel from the 3D image sensor serving to generate the depth image. In particular, a depth image can be a gray scale value image or a color value image in which the pixel values correspond to gray scale values or color values in accordance with a gray scale or a color value scale, so that the gray scale value or the color value of a pixel provides a measure of the spatial distance mentioned above.

A "characteristic depth image value" is intended to be understood to mean a value, which may be a numerical value, which is associated with the depth image under consideration, which value is derived from pixel values of pixels of the depth image, in particular from all pixel values or from a certain subset of these, and which characterizes the depth image as a whole in such a way that it (the value) is in principle suitable in order to distinguish different depth images from one another. Here, "in principle" means that, in the majority of cases, in particular in the vast majority of cases, such a distinction is possible, even though a true collision resistance in the sense that it is practically impossible or extremely unlikely that two different depth images nevertheless lead to the same depth image value does not necessarily need to be required, although it can be required.

A characteristic depth image value can be generated by using an "averaging method" or by "averaging". In the present application, such an "averaging method" is intended to be understood to mean a method of calculating an average value (in short also simply "average"). In this context, an average value is a further number which is determined from given numbers in accordance with a certain calculation rule, which further number represents a characteristic value for the central tendency of the distribution of the given numbers. In particular, the calculation of the arithmetic mean, the geometric mean, the quadratic mean, the cubic mean, the harmonic mean, the mode and the median are each averaging methods in the sense of the invention.

In the sense of the invention, a "monotonic combination rule" is intended to be understood to mean a combination rule for determining a resulting value from a plurality of input values, in the present case depth image values, which combination rule has a monotonicity property in the sense that the resulting value is either (i) always greater than, or equal to, each of the input values, or alternatively (ii) always less than, or equal to, each of the input values. In particular, the combination rule may be a mathematical calculation rule. In particular, the summation of numbers of the same sign, as well as the multiplication of numbers of the same sign and with an absolute value of at least one, each represent monotonic combination rules in the sense of the invention. It is decisive for the delimitation of the term that all input values influence the resulting value in "the same direction" or, in the case of a value for the respective input value which is neutral with respect to the combination rule (e.g., zero), leave it unchanged and thus a mutual amplification effect occurs. For example, if a first depth image of a first 3D image sensor substantially (i.e., except for further objects which are detected as "non-persons", such as for example luggage) images only a first person in the interlock, and a second depth image of a second 3D image sensor, which is opposite to the first one, images substantially only a second person standing directly behind the first person from the point of view of the first 3D image sensor and in front of the first person from the point of view of the second 3D image sensor in the monitored spatial area of the interlock, then the resulting value which is formed from the depth image values of the two depth images by the combination rule should in principle permit a differentiation of this situation in the personnel interlock from a situation in which only one person is present in the monitored spatial area of the personnel interlock, which is something that is achieved by the monotonicity requirement.

In the sense of the invention, a "comparison" of several values, in the present case of the total image value and at least one predetermined reference total image value, is intended to be understood to mean a rule, which can be a mathematical calculation rule, and (i) in which the result of the application of the rule provides a statement as to whether the values differ from one another, and (ii) which provides a measure of how much the values which have been compared differ from one another in the case that they are not equal. In accordance with a simple example, the comparison of two numbers can be carried out by calculating the arithmetic difference of the two numbers. The quotient of the numbers represents another simple example of a comparison rule.

The method in accordance with the first embodiment provides a simple and yet robust estimation and differentiation of the presence of one person or however a plurality of persons in the monitored spatial area of a personnel interlock. Advantageously, the steps which are required to carry out the method, in particular the steps of determining the estimation result from the received depth images, involve little processing effort, in particular computational complexity. Thus, for example in contrast to complex and thus computationally intensive image processing methods and modeling methods which are frequently used within the framework of person recognition, processing devices, in particular computer systems such as for example microcontrollers, with relatively low processing power can also be used here. This is of importance with regard to a particularly efficient and cost-effective solution. Furthermore, 3D image sensors that are known per se and which are thus readily available at a modest cost, such as for example stereo cameras or TOF cameras, can be used for the generation of the depth images which are processed within the framework of the method.

In the following, preferred embodiments of the method will be described, each of which, as far as this is not expressly excluded or technically impossible, can be combined in any desired manner with one another, as well as with the further other embodiments which are described herein, and which, in particular, likewise relate to these other embodiments which are further described below.

In accordance with some embodiments, the method further comprises the triggering of a functionality of the personnel interlock in dependence upon the estimation result. In this way, the estimation result which has been obtained can be used in an automated manner for the further control of the personnel interlock, which can be advantageous with regard to an extensive or complete automation of the personnel interlock. The functionality to be triggered may relate to a signaling, such as for example a visual or acoustic signaling, or an output of information at a user interface, or it may relate to the opening or the closing of restrictions of passage to the personnel interlock, in particular one or more doors, or the activation of an authentication process for authenticating a person located in the personnel interlock. If, for example, in accordance with the estimation result, it has been determined that there is only a single person in the personnel interlock, the authentication mentioned above could be triggered, while otherwise, if it has been determined that a plurality of persons are in the interlock, a corresponding signaling in the sense of an alarm notification, as well as an output of information or a user interface, for example to the effect that the persons are to leave the personnel interlock, are triggered with simultaneous opening of an access door or a pair of access doors to the personnel interlock.

In accordance with some embodiments, the personnel interlock can be operated as a bidirectional passage interlock and the method is applied for each of the two directions of passage. Thus, the personnel interlock can also be used when a bidirectional operation is required, for example when an access check as well as an exit check of persons is required with respect to a spatial area which is secured by the personnel interlock, in particular for monitoring the separation of persons. With the aid of such a bidirectional personnel interlock, a bidirectional operation can be realized in a particularly space-saving manner. In particular, a parallel operation of several personnel interlocks for different directions of passage can be avoided in this way while maintaining the advantages of the solution in accordance with the embodiments mentioned above, or at least the number of personnel interlocks which are operated in parallel can be reduced for the same volume of passage through the interlock (number of persons to be processed per unit of time).

In accordance with some embodiments, the spatial area of the personnel interlock can be closed off at least on one side by a movable restriction of passage, for example one or more doors, or a barrier, and the method further comprises: (i) determining the distance of an object located in the spatial area on the basis of at least one of the depth images, and (ii)

triggering an opening or a closing of the restriction of passage as a function of the distance that has been determined. In this way, it is possible to trigger the opening and/or the closing of the restriction of passage as a function of where one or more objects that are located in the personnel interlock, in particular persons, possibly including any items brought along, are located within the personnel interlock. This can be used to prevent the movement for opening or closing the restriction of passage from occurring at a point in time when there is a risk of an undesired interaction between the moving restriction of passage and the object. It is also conceivable to determine the point in time or the period of time for acquiring the depth images which are to be processed in accordance with the method for the purpose of determining the estimation result as a function of the distance that has been determined. Thus, in particular, a point in time for the acquisition can be selected at which, in relation to the 3D image sensors, the object is located at an optimal position in the monitored spatial area for the acquisition of the depth images.

In accordance with some embodiments, the method further comprises: carrying out an image transformation with respect to at least one of the depth images, in particular all of the depth images, prior to the calculation of its respective characteristic depth image value, wherein the respective depth image is combined with a reference depth image within the framework of the image transformation in accordance with a predetermined transformation rule, by which image areas in the respective depth image with respect to which image areas the respective depth image and the reference image match with respect to their respective mutually corresponding pixel values are contrasted, by a predetermined modification of their associated image values, from other areas of the image in which there is no such match. This modification can include, in particular, that the pixel values in the matching areas of the image are each set to an extreme value, in particular the smallest or the largest defined pixel value, and are thus set apart from the other image values. For example, this extreme image value could correspond to the image color "black", so that the transformed depth image has pixels with a pixel value which is different from black only in those places where the mutually corresponding pixel values of the original depth image (before the transformation) and the reference image do not match. These embodiments have the advantage that, in the transformed depth image, the at least one object to be monitored always appears segmented against a contrasting background of the image, which can help to further improve the efficiency and the robustness of the subsequent further image processing.

In accordance with some embodiments, when the characteristic depth image values, for example in the form of corresponding averaged image values, are being calculated, the depth image value of at least one of the depth images is calculated on the basis of a subset of the individual pixel values of that depth image, wherein the pixels of the subsets are selected on the basis of their respective pixel value in such a way that all of these pixels each have a pixel value which is beyond a predetermined pixel value threshold or which is within a predetermined pixel value range. For example, the pixel values could be represented by gray scale values, with a dark gray scale value corresponding to a large distance and a light gray scale value corresponding to a short distance between the 3D image sensor generating the respective depth image and the captured object. The pixel value threshold could then be set such that only pixels the gray scale value of which is above (optionally: or corresponds to) the pixel value threshold are used to determine the characteristic depth image value. Such a segmentation of the depth image can be used for the identification of any different areas of emphasis or clusters in the depth image, which can be used as additional information for the determination of the estimation result. Furthermore, the segmentation can also be used to increase the robustness of the method, since now only those portions of the image are used for the subsequent determination of the estimated value which are particularly representative of the detected object.

In accordance with some embodiments of this, the at least one subset is additionally determined as a function of the respective spatial position of the pixels in the respective depth image. Thus, in particular only those pixels could be included in the at least one subset which have a minimum distance from the edge of the depth image, for example in order to avoid false evaluations due to edge effects in the edge region of a captured depth image.

A second embodiment of the invention relates to a monitoring system for monitoring a spatial area in a personnel interlock, in particular for the monitoring of the separation of persons, wherein the system is set up to carry out, with respect to the personnel interlock, the method in accordance with the first embodiment of the invention mentioned above, optionally in combination with one or more of the embodiments of this described herein.

A third embodiment of the invention relates to a computer program which comprises instructions which, when they are being executed on one or more processors of the monitoring system in accordance with the second embodiment of the invention, cause the monitoring system to carry out the method in accordance with the first embodiment of the invention, optionally in combination with one or more of the embodiments of this described herein.

The computer program may be stored on a non-volatile data carrier. Preferably, this is a data carrier in the form of an optical data carrier or a flash memory module. This may be advantageous if the computer program as such is to be traded independently of a processor platform on which the one or more programs are to be executed. In a different implementation, the computer program may be provided as a file or a group of files on one or more data processing units, in particular on a server, and can be downloaded via a data connection, for example the Internet, or a dedicated data connection, such as for example a proprietary or a local network. In addition, the computer program may comprise a plurality of interacting, individual program modules.

Accordingly, the monitoring system in accordance with the second embodiment may comprise a program memory in which the computer program is stored. As an alternative, the monitoring system may also be set up to access, via a communication link, a computer program which is available externally, for example on one or more servers or other data processing units, in particular in order to exchange data with it, which data are used during the course of the method or during the execution of the computer program or which data represent outputs of the computer program.

A fourth embodiment of the invention relates to a personnel interlock, comprising: (i) a monitoring system in accordance with the second embodiment, optionally in combination with one or more of the embodiments of this described herein, for monitoring a spatial area of the personnel interlock, in particular for the monitoring of the separation of persons; and (ii) a plurality of 3D image sensors which are arranged at different positions in the area of the personnel interlock, wherein each of the 3D image sensors is set up to generate an associated depth image of the spatial area and to supply it to the monitoring system, wherein the respective depth image indicates, for each of its pixels, on the basis of a pixel value assigned thereto, the distance of the object or of the portion of the object imaged thereon from the associated 3D image sensor.

In the following, certain preferred embodiments of the personnel interlock will be described, each of which, as far as this is not expressly excluded or technically impossible, can be combined in any desired manner with one another, as well as with the further, other embodiments of the invention which are described herein.

In accordance with some embodiments, two of the 3D image sensors are arranged to be disposed on sides of the spatial area which are opposite to one another, in order to capture, in an image sensor-based manner, the spatial area from central detection directions which, at least substantially, run in opposite directions to one another. Each of the 3D image sensors is set up to capture an entire two-dimensional field of view which extends in the lateral direction, and additionally to detect a third dimension (depth component of the captured image) for this field of view.

In the present context, a "central detection direction" of a 3D image sensor is intended to be understood to mean a direction which extends from the center or the geometric center of gravity of this field of view and which runs perpendicular thereto, which thus defines a central virtual line in the field of view of the 3D image sensor (corresponds to the axis of view or, in the case of a rotationally symmetrical optical system, its optical axis in the sense of optics).

In the present context, "at least substantially" is intended to mean that the central detection directions of the two 3D image sensors include an angle in the range of from 135 to 225 degrees (180 degrees corresponds to central detection directions that are exactly opposite to one another).

In this way, the reliability of the personnel interlock with regard to the monitoring of the separation can be further increased, since an object or a group of several objects, in particular a group of several objects which are located close to each other, can thus be detected from two significantly different central detection directions in an image sensor-based manner. During the course of the detection of potentially a plurality of such objects, this enables significant advantages to be achieved in terms of the robustness of the detection method when compared with a detection from only slightly different central detection directions. In particular, a simultaneous detection of the front and rear of the object or of the group of objects is made possible by this.

In accordance with some embodiments, the two 3D image sensors which are located opposite to one another are arranged in such a way with respect to the spatial area that the projection of their central detection directions onto a defined virtual plane which extends horizontally with respect to the personnel interlock intersects a direction of passage which is projected onto the same plane and which is defined by the geometry of the personnel interlock at an angle which is different from zero, so that each of the central detection directions of the two 3D image sensors extends obliquely with respect to the direction of passage. In this way, it is possible to arrange the 3D image sensors outside a passage corridor which is defined by the direction of passage, for example in a corner of the spatial area inside the personnel interlock. This avoids, on the one hand, a situation where the 3D image sensors obstruct a passage through the interlock and, on the other hand, a need for the 3D image sensors to be arranged on an otherwise unnecessary ceiling structure of the interlock or on a restriction of passage of the interlock, such as for example on one or more doors.

In accordance with some embodiments, the two 3D image sensors which are located opposite to one another are arranged on, or are structurally integrated into, a restriction of passage on an entrance side or on an exit-side, in particular a door or a pair of doors, of the personnel interlock. In accordance with some embodiments, the personnel interlock further comprises an authentication device which is accessible only via the spatial area, for authenticating a person present in the personnel interlock. In addition, the authentication device comprises a user interface having a distinguished main direction of interaction for the interaction between the user interface and a user thereof. In this context, the user interface is arranged with respect to the spatial area in such a way that its main direction of interaction projected onto the horizontal virtual plane extends, with respect to the respective projection of the central detection direction of the two 3D image sensors which are opposite to one another, at an angle which is different from zero. In this way, it is ensured that there is at least an approximate alignment of the central detection direction of one of the 3D image sensors with the main direction of interaction of the authentication device, and thus a person can be monitored, in an image sensor-based manner, by the 3D image sensor, in particular from the front or from behind, even while an authentication is being carried out, in an optimum manner.

A "main direction of interaction" of the user interface is intended to be understood to mean a direction in space with respect to which direction the user interface is directed in the sense that it is configured to enter into contact with the user for input and/or output of user interface information only within a limited solid angle (of any shape) defined around this main direction of interaction. In this sense, in particular a display screen, a camera, a sensor for biometric features (a fingerprint sensor, a facial scanning sensor, an iris scanner, etc.), a keyboard, or a built-in microphone that can receive sound waves substantially only from a limited solid angle in front of the user interface each represent user interfaces or elements thereof, each of which has an associated main direction of interaction.

In accordance with some embodiments, the arrangement of the at least one authentication device is designed so as to be reconfigurable in terms of its position or orientation with respect to the spatial area, or both. By this, in particular an adaptation of the personnel interlock, which is application specific, for example an adaptation in dependence upon whether the personnel interlock is to be used as a unidirectional or as a bidirectional interlock, becomes possible. For example, in particular in the bidirectional case, the authentication device could be configured at an angle with respect to the passage area in such a way that its user interface always faces towards a person entering the personnel interlock, regardless of the person's direction of entry into the personnel interlock. As an alternative, a separate authentication device could also be provided for each of the directions of passage, which authentication device is positioned and oriented in such a way that, again, its respective user interface always faces towards a person entering the personnel interlock along the corresponding direction of passage. In this context, each of the authentication devices could be arranged in a decentralized manner in relation to the passage area or the spatial area of the personnel interlock, so that the authentication devices are placed at a substantial distance from one another. This is advantageous with regard to the embodiment described below, in which a detection is carried out as to whether a person has reached or has crossed a center of the spatial area.

In accordance with some embodiments, the authentication device or at least one of the authentication devices is directly or indirectly attached to a baseboard in the spatial area of the personnel interlock. This can be advantageous in the sense that such a baseboard, which is already present for other reasons, also represents a holding structure and a guiding structure, in particular a rail, in the sense of a multiple use (dual-use), along which the respective authentication device is mounted so as to be displaceable for the purpose of its variable arrangement. In this way, a particularly efficient implementation can be achieved.

In accordance with some embodiments, the authentication device or at least one of the authentication devices is arranged beyond the center of the spatial area in relation to the course of the associated direction of passage through the personnel interlock. In this way, it can be achieved that a person entering the personnel interlock in the direction of passage has to cover a minimum distance which extends beyond the center of the personnel interlock before he or she can authenticate himself or herself, so that it is ensured that sufficient time is available for monitoring, and/or so that a portion of the spatial area which is particularly suitable for the detection in an image sensor-based manner must be traversed before the authentication is possible. In particular, such a portion can be provided in the center of the spatial area.

In accordance with some embodiments, each of the 3D image sensors is arranged on an associated support structure of the personnel interlock provided laterally in the surrounding area of the spatial area. Such a support structure can either be a structure which is formed separately from the lateral spatial boundary structures of the personnel interlock, in particular from any possibly existing side walls or doors thereof, or it can however coincide with at least one of these boundary structures. The advantage of using such a lateral support structure is again that there is no need for a ceiling structure for the personnel interlock, which ceiling structure may also be provided for this purpose.

The features and advantages which have been explained in relation to the different embodiments can include any combinations and sub-combinations of the described embodiments.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1A:
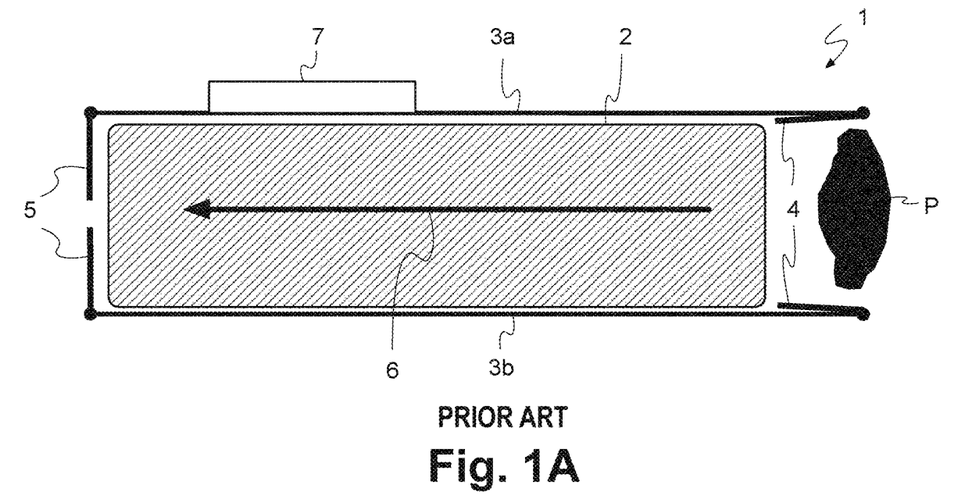
FIGS. 1A and 1B are top views that schematically illustrate a known type of personnel interlock, with two different operational states shown for the unidirectional movement of a person through the interlock.
Figure 1B:
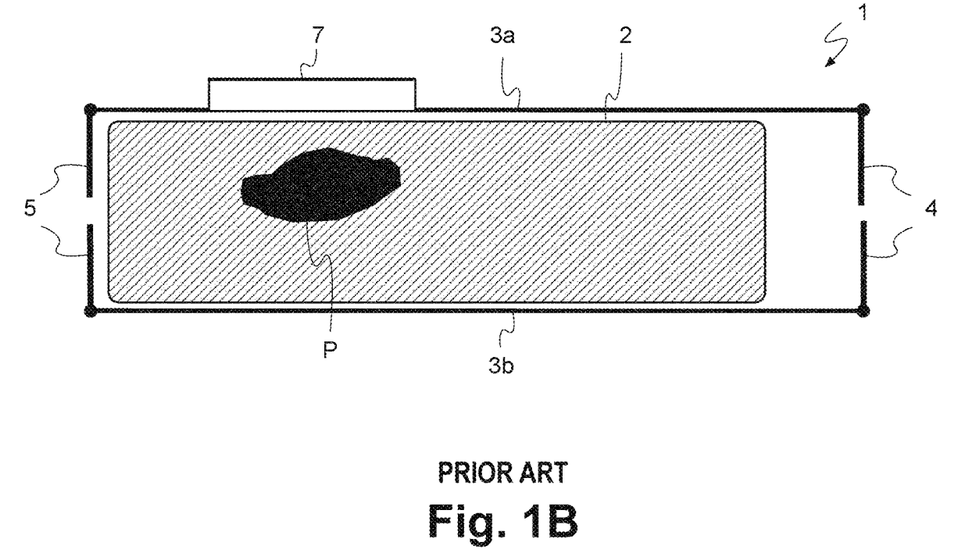

The personnel interlock 1 illustrated in FIGS. 1A and 1B in a top view is constructed as a lockable channel with a substantially rectangular base, the lateral boundaries of which are formed by two side walls 3a and 3b, a pair of pivot doors 4 which, in relation to a direction of passage 6 through the personnel interlock, are on the entrance side, as well as a further pair of pivot doors 5 which, in relation to the direction of passage 6, are on the exit side. The interior space, which is enclosed by these lateral boundaries, or at least the predominant central part thereof, represents a spatial area 2 (indicated by hatching) which is monitored by an associated monitoring system. In conventional personnel interlocks, such as the one shown in FIGS. 1A and 1B, this monitoring system is typically arranged in a ceiling (not shown) of the personnel interlock, so that, accordingly, the monitoring of the spatial area, in particular for the purpose of the monitoring of the separation, takes place from above. When a person P wants to pass through the personnel interlock 1, he or she enters the spatial area 2 of the personnel interlock 1 through the then open pair of doors 4 (FIG. 1A), if applicable after prior identification (for example by an ID card reader at the entrance), and traverses the spatial area 2 up to an authentication device 7 of the personnel interlock 1 provided therein in order to authenticate himself or herself there (FIG. 1B).

Immediately after the person P has entered the spatial area 2, the pair of doors on the entrance side is closed in order to prevent the entry of a further person before the process of passing through the interlock has been completed, or at least to make this more difficult. The authentication can take place in a known manner on the basis of at least one biometric feature of the person P detected by the authentication device 7 in a sensor-based manner, for example by iris recognition, fingerprint recognition or facial measurement. During the entire period from the entry of the person P into the personnel interlock until his or her successful authentication by the authentication device 7, the pair of doors 5 on the exit side remains closed. In the case of a successful authentication, it opens in order to allow the person P to exit the personnel interlock. Otherwise, it remains closed, and the passage is thus denied.

Figure 2A:
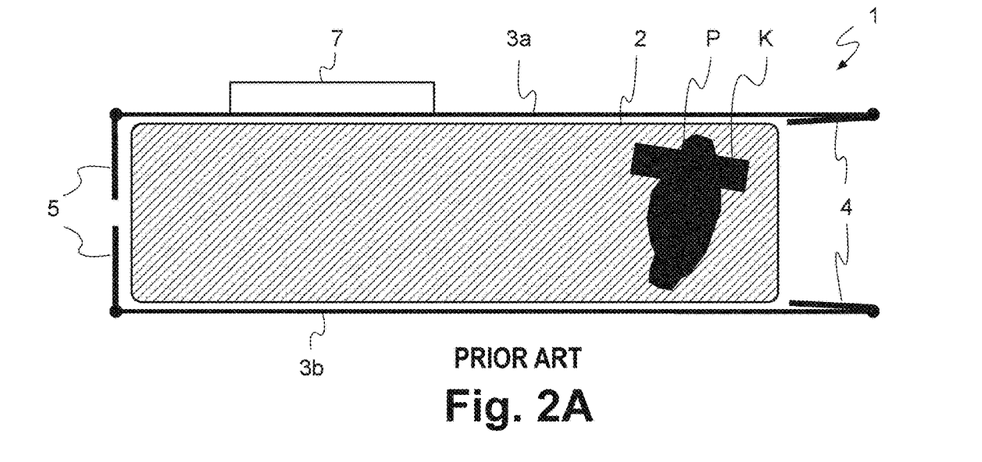
FIGS. 2A-2C are top views that schematically illustrate various example scenarios with regard to the presence of one or more persons in the personnel interlock of FIGS. 1A and 1B, whereby the scenarios are to be distinguished with regard to the number of persons present in the interlock.
Figure 2B:
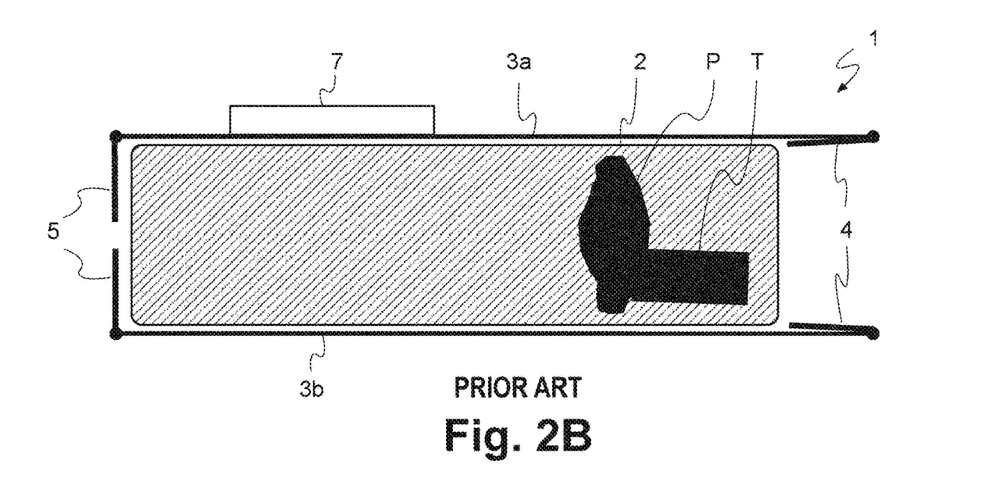
Figure 2C:
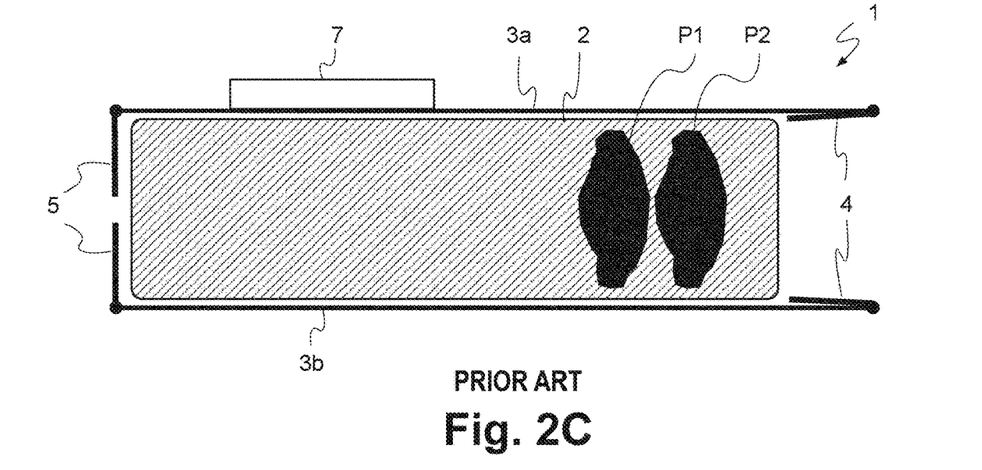

In FIGS. 2A through 2C, three different example scenarios relating to the presence of one or more persons in a personnel interlock 1, using the personnel interlock 1 from FIG. 1A as an example, are schematically illustrated. In particular, the personnel interlock can secure an access to an area with restricted access, in particular a security area, such as for example a passenger area or an airline passenger check-in area. In the scenario in accordance with FIG. 2A, there is exactly one person P in the personnel interlock 1, whereby the person P is carrying a suitcase K designed to be carried by hand. In the scenario in accordance with FIG. 2B, there is again exactly one person P in the personnel interlock 1, but this time he or she is not carrying a suitcase, but is instead pulling a trolley bag T (wheeled suitcase designed to be pulled) behind him or her. By way of contrast, in the scenario shown in FIG. 2C, there are two persons P1 and P2 in close succession in the personnel interlock 1. For the purpose of monitoring the separation, a suitable monitoring system therefore has to be able to distinguish between the different scenarios, i.e., to recognize the two scenarios shown in FIGS. 2A and 2B as permissible and the scenario shown in FIG. 2C as not permissible.

Figure 3A:
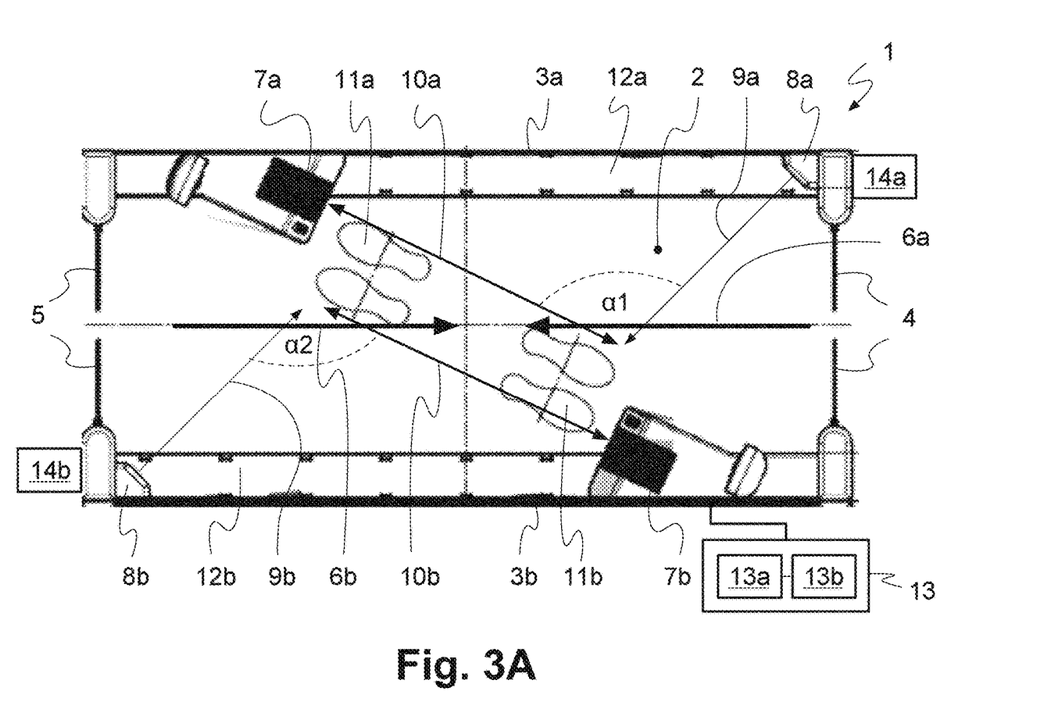
FIG. 3A is a top view that schematically illustrates a personnel interlock in accordance with one embodiment of the present invention, which personnel interlock can be used in a unidirectional or in a bidirectional manner.
Figure 3B:
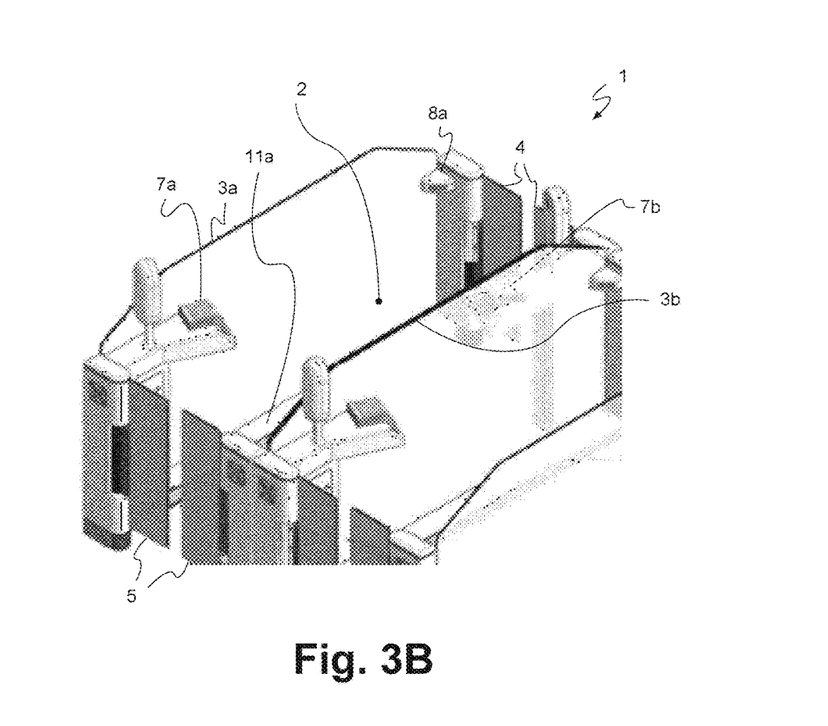
FIG. 3B is a top perspective view of the personnel interlock of FIG. 3A.

In FIGS. 3A and 3B, a personnel interlock 1 in accordance with one preferred embodiment of the invention is shown, on the one hand in a top view (FIG. 3A) and on the other hand (without a monitoring system) in a partial perspective view from diagonally above (FIG. 3B, which at the same time also shows, in the bottom right portion of the image, a portion of a further personnel interlock, which is directly adjacent).

Also in this personnel interlock 1, a monitored spatial area 2 is provided in its interior space which is enclosed by side walls 3a and 3b as well as two pairs of doors 4 and 5, which monitored spatial area 2 preferably covers, at least substantially, the entire interior space. The personnel interlock is designed as a bidirectional passage interlock, which can be applied if both the entry into, and the exit from, an area with restricted access is to be monitored by the same personnel interlock 11 and an authentication is required in each case.

For the purpose of monitoring, in particular for the purpose of monitoring the separation, with respect to the spatial area 2, the personnel interlock 1 is provided with two monitoring systems 8a and 8b which are arranged in opposite corners and thus also on the sides of the spatial area 2, which has a substantially rectangular base. Each of these is constructed as a 3D image sensor, for example as a stereo camera or as a TOF camera or as a pair of individual cameras the individual output signals of which are combined in such a way that the combination provides a 3D image like an integral stereo camera would do. Each of the 3D image sensors is set up to at least partially capture the spatial area 2 in an image sensor-based manner from central detection directions which run, at least substantially, in directions which are opposite to one another, and in a corresponding manner, to generate a depth image which covers the spatial area 2, at least for the most part, and to supply it to a monitoring system 13. In connection with this, the respective depth image indicates, for each of its pixels, on the basis of a pixel value assigned thereto, the distance of the object or of the portion of the object imaged thereon from the associated 3D image sensor 8a or 8b.

Figure 4A:
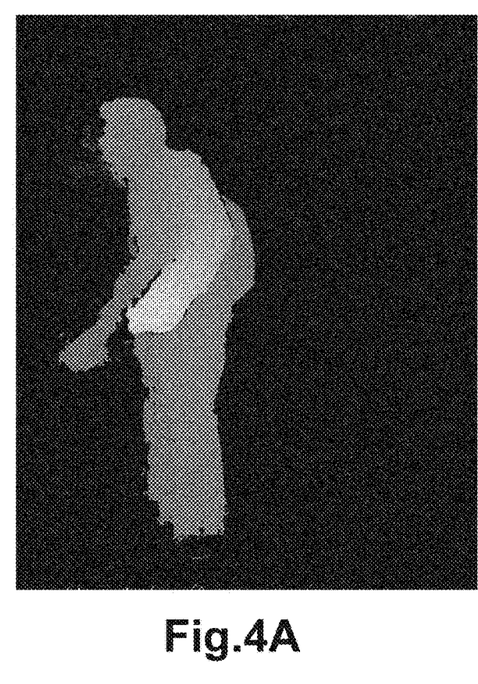
FIGS. 4A and 4B are photographic images showing two examples of depth images produced by the personnel interlock of FIG. 3A, each in the form of a gray scale image.
Figure 4B:
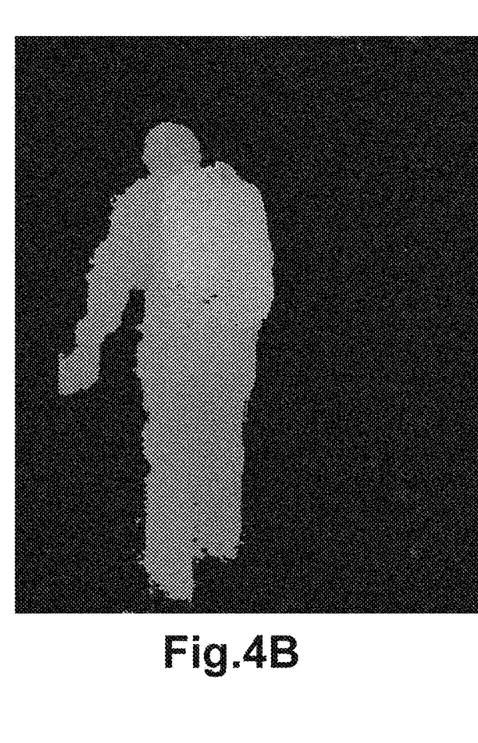

Two different examples of such a depth image in the form of a gray scale image are respectively shown in FIGS. 4A and 4B, whereby the areas of the image with a bright (large) gray scale value indicate a short distance of the object from the 3D image sensor and, in a corresponding manner, the areas of the image with a dark (small) gray scale value indicate a long distance of the object from the 3D image sensor. In each of these cases, the person P detected in the personnel interlock 1 stands out clearly from the dark background of the depth image.

Referring again to FIG. 3A, the two 3D image sensors which are located opposite to one another are, due to their position near a corner, arranged with respect to the spatial area 2 in such a way that the respective projections 9a and 9b of their respective central detection directions extending diagonally from the respective associated corner of the spatial area 2 onto a defined virtual plane which extends horizontally with respect to the personnel interlock and which virtual plane can coincide, for example, with the plane which is defined by the floor surface of the spatial area 2, intersects, in each case, at an angle which is different from zero, a respective direction of passage 6a and 6b which is projected onto the same plane and which is defined by the geometry of the personnel interlock 1. Thus, each of the projections 9a, 9b of the central detection directions of the two 3D image sensors 8a, 8b extends in an oblique direction with respect to the respective associated direction of passage 6a and 6b.

For the purpose of authenticating a person P, the personnel interlock 1 comprises two authentication devices 7a and 7b in its spatial area 2, one for each direction of passage 6a and 6b, respectively. Each of the authentication devices 7a and 7b in turn comprises an associated user interface with a distinguished main direction of interaction 10a and 10b, respectively, for the interaction between this user interface and a user of the same (in this regard, where applicable, no distinction is made between an input direction and an output direction, but instead these are collectively referred to as the "main direction of interaction", as is represented by the respective double arrow in FIG. 3A). In this context, it is envisaged that each of the authentication devices 7a and 7b is oriented in such a way that its associated user interface is arranged with respect to the spatial area 2 in such a way that its main direction of interaction 10a and 10b, respectively, projected onto the horizontal virtual plane, extends at a respective angle α1 and α2 which is different from zero and which is preferably between 45 degrees and 135 degrees, with respect to the respective projection of the central detection direction 9a and 9b, respectively, of the two 3D image sensors, which are located opposite to one another. Preferably, the respective authentication device is arranged in such a way that its main direction of interaction is at an angle in the range of from 30 degrees to 60 degrees in relation to the associated side wall 3a and 3b, respectively, in particular in such cases where the 3D image sensors are not provided in corners of the spatial area, but elsewhere, in particular on an end side, such as in, or on, the restrictions of passage.

Thus, when a user interacts with the respective user interface respectively from a position 11a or 11b along its main direction of interaction 10a or 10b, respectively, he or she can be detected, in a sensor-based manner, by the 3D image sensors 8a and 8b, in each case from the side along their respective central detection direction 9a and 9b, respectively, so that a particularly favorable spatial constellation results for the detection of a further person P2 which may possibly be in the personnel interlock, in particular a further person P2 located directly behind the person P or P1, in which particularly favorable spatial constellation the reliability of the detection of a further such person P2 is increased due to the lateral view of the 3D image sensors 8a and 8b, respectively.

Each of the authentication devices 7a and 7b is attached, directly or indirectly via a corresponding support structure (not shown), to a baseboard 12a and 12b, respectively, at the lateral edge of the spatial area 2. Optionally, they may also be mounted so as to be slidable along the baseboard. Preferably, the authentication devices 7a and/or 7b are arranged beyond the center of the spatial area 2 (cf. vertical dashed center line in FIG. 3A) with respect to the course of the direction of passage 6a and 6b, respectively, as shown in FIG. 3A, so that the person to be authenticated has to cross this center in order to reach the authentication device 7a or 7b respectively associated with the corresponding direction of passage 6a or 6b.

For this purpose, the personnel interlock 1 can be configured in such a way that the corresponding pair of doors 4 or 5 used for access is closed when the person having entered passes this center, which can be detected by the 3D image sensors 8a or 8b, respectively.

Furthermore, the personnel interlock 1 comprises a monitoring system 13, which may comprise a processor platform 13a with one or more processors as well as an associated memory 13b. The monitoring system 13 serves to control the personnel interlock 1, in particular for carrying out a method of monitoring the spatial area 2 of the personnel interlock 1, such as for example for monitoring the separation of persons with respect to the spatial area 2. An example embodiment of such a monitoring method in accordance with the invention is explained in the following with reference to FIGS. 4A and 4B. In particular, the method may be embodied in the form of a computer-implemented method, for which purpose one or more corresponding computer programs which are configured to carry out the method on the processor platform 13a may be stored in the memory 13b of the monitoring system 13 in order to be used by the processor platform 13a for carrying out the method.

Finally, the personnel interlock 1 can also have an identification device 14a or 14b respectively associated with the respective pair of doors on the entrance side for one or both directions of passage. This serves to ensure that a person P who wishes to pass through the personnel interlock first has to identify himself or herself before entering it, for example by an ID card. In this way, it can be achieved that even the spatial area 2 is only accessible, by the respective pair of doors on the entrance side being opened, if such an identification has been carried out successfully. By this, it can be ensured that an identification of the person P to be processed through the interlock takes place even if the subsequent authentication process is unsuccessful or, in the case that even the identification is unsuccessful, the personnel interlock 1 is not even opened at all.

Figure 5A:
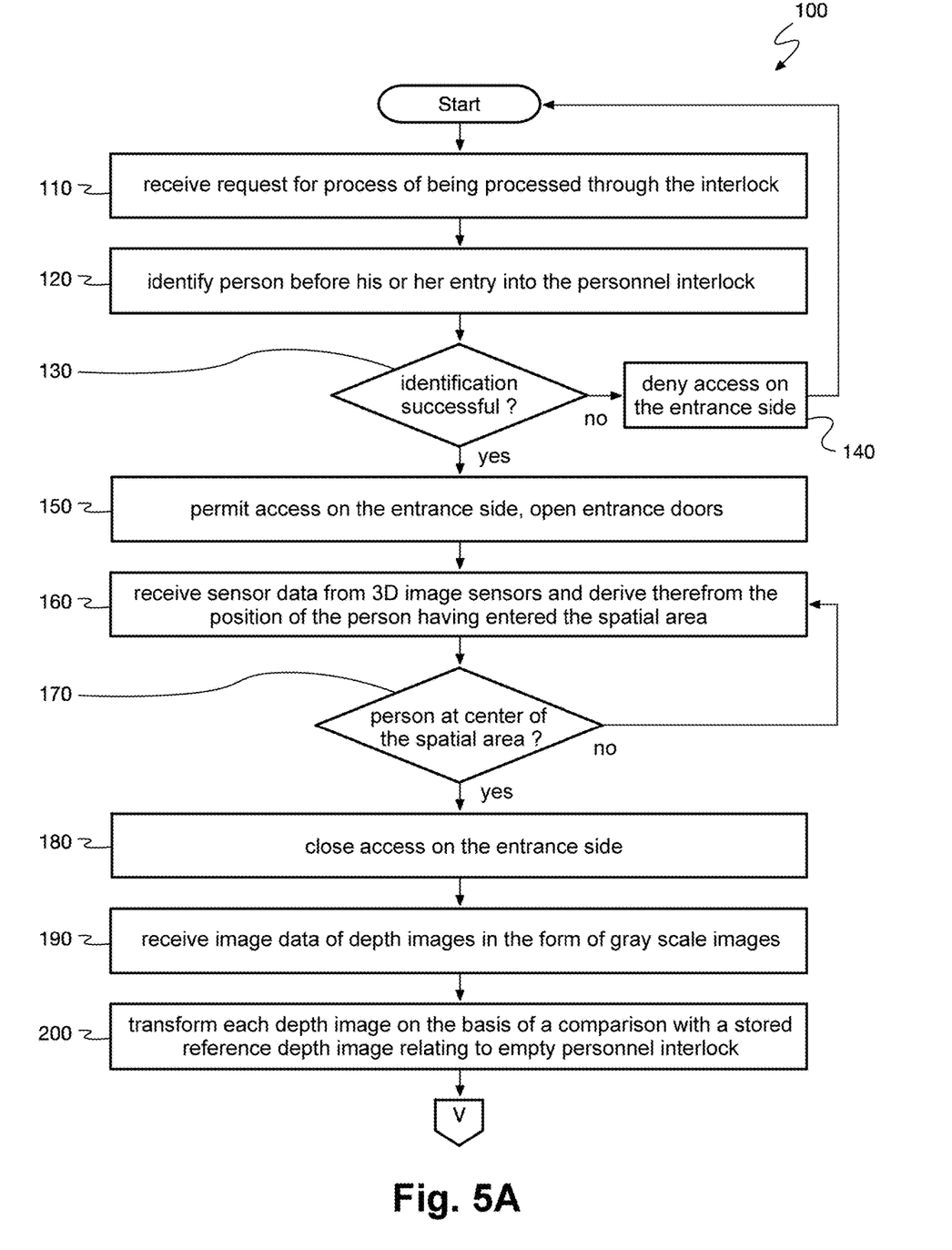
FIGS. 5A and 5B are a flow chart that schematically illustrates steps of one embodiment of a method for using a personnel interlock in accordance with the invention.
Figure 5B:
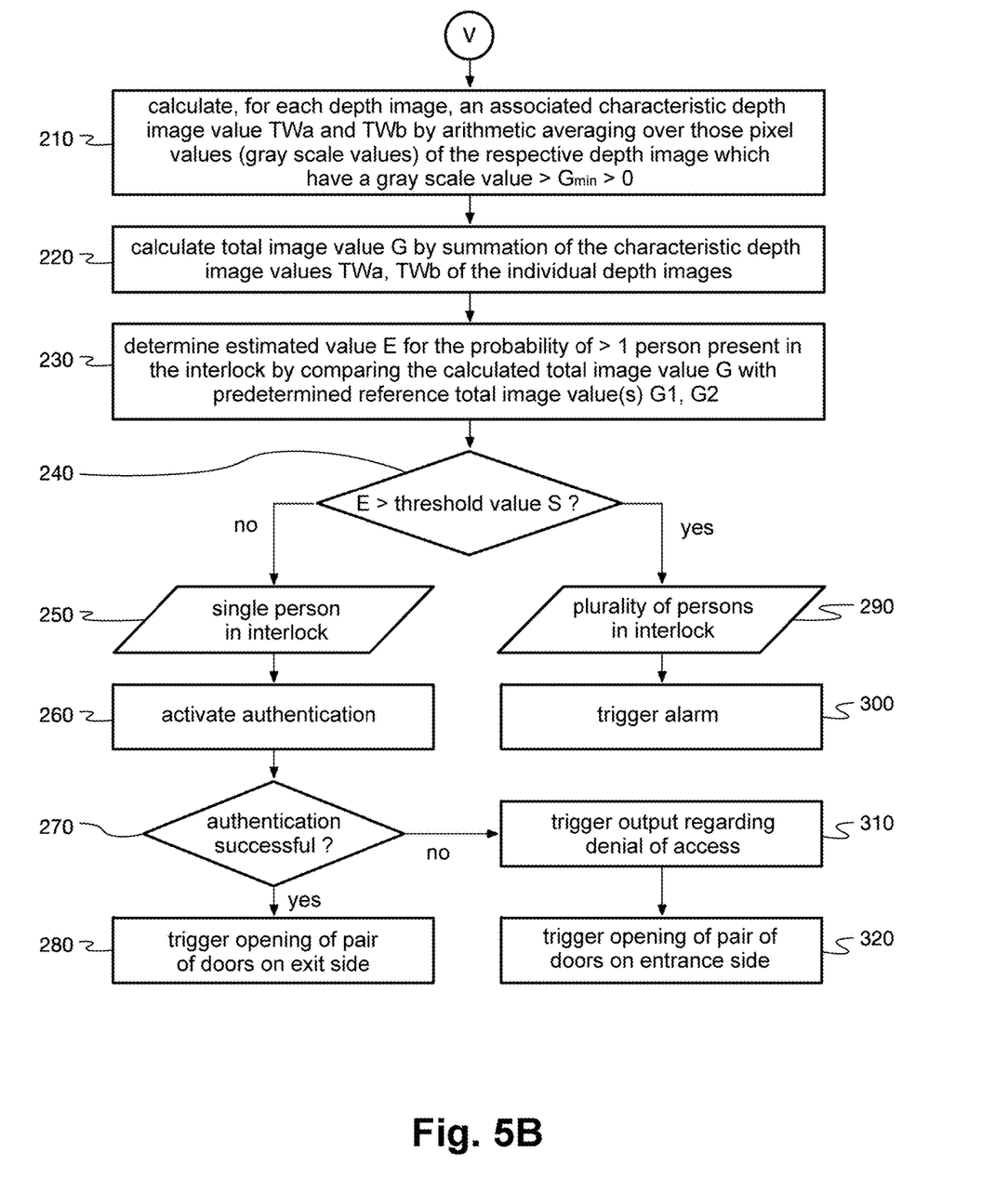

FIGS. 5A and 5B together illustrate a flow diagram, linked via the connector "V", for an example method 100 in accordance with various embodiments of the invention which, here, are combined with one another. In particular, the method may be carried out by the monitoring system 13 of the personnel interlock 1 in accordance with FIG. 3A, and it will be explained in the following with reference to this example personnel interlock 1.

The method assumes an initial state of the personnel interlock 1 in which both of its two pairs of doors 4 and 5 are closed and no person is present in the spatial area 2 of the personnel interlock 1. For the purpose of explanation, it is assumed in the following that the personnel interlock 1 is to be passed in the direction of passage 6a. However, the following explanations apply in a corresponding manner in relation to the opposite direction.

The process of being processed through the interlock can begin with a person P who wants to pass through the personnel interlock 1 triggering the control process by a corresponding predetermined action, in particular in the outer surrounding area of the pair of doors 4 on the entrance side in relation to the respective direction of passage 6a or 6b. For example, this could be done by actuating a switch or by the person P stepping so closely up to the pair of doors 4 from outside the personnel interlock 1 that this approach is recognized by a proximity sensor of the personnel interlock 1. Accordingly, when the triggering of the process of being processed through the interlock is recognized by the personnel interlock 1, this is reported to the monitoring system 13 as a corresponding request, which is received at the monitoring system 13 in a step 110.

In the example embodiment described here, the personnel interlock 1 has an identification station 14a which is located in front of the spatial area 2 and the pair of doors 4 bounding the latter, for example an ID card reader or an input control panel for a PIN, at which the person P first has to identify himself or herself, in accordance with these examples by an authorized ID card or a PIN. In the step 120, this identification is carried out by the monitoring system 13 by a comparison of the identification data detected at the identification station 14a with a database of authorization data. These can either specifically classify certain persons or identification data assigned to them as "authorized" or "not authorized", or can more generally only specify certain requirements, such as the type of ID (e.g., passport or ID card authorized, but driver's license or student ID card not authorized).

If this identification is not successful (130—no), the access through the pair of doors 4 on the entrance side is denied by the monitoring system 13 in the step 140. This can be done by a corresponding control signal for closing the pair of doors 4 or for leaving the pair of doors 4 closed being issued, or however simply by the fact that the issuing of a corresponding control signal for opening the pair of doors 4 does not occur. Otherwise (130—yes), in a step 150, access on the entrance side is permitted and, for this purpose, the pair of doors 4 is controlled in such a way that it opens.

Now, in a step 160, sensor data generated by the 3D image sensors 8a and 8b, in particular depth images, are received at the monitoring system 13, and a current position of the person P who has entered the spatial area 2 of the personnel interlock 1 is derived from this. This can be done by a maximum gray scale value being identified in at least one of the depth images and a distance of the person P from the respective image sensor 8a or 8b being determined as a function of this.

It is then determined, by a comparison in the step 170, whether the person P has already reached or crossed the center or the virtual center line of the spatial area 2 on the basis of his or her position which has been determined in accordance with step 160. If this is not the case (170—no), the method returns to the step 160 in order to continue tracking the respective current position of the person P on the basis of the sensor data. Otherwise (170—yes), in the step 180, the closing of the pair of doors 4 on the entrance side is triggered by a corresponding control signal. Thus, the personnel interlock 1 is now closed on all sides and the monitoring of the separation begins.

For this purpose, image data is received in the step 190 by the monitoring system 13, which are simultaneously generated and supplied by the two 3D image sensors 8a and 8b in the form of depth images defined as gray scale images. Before the actual evaluation of these depth images takes place, they are each transformed in the step 200 on the basis of a comparison with a stored reference depth image associated with the respective 3D image sensor 8a and 8b. For example, these reference depth images were previously recorded by the respective 3D image sensor 8a and 8b during an initialization of the personnel interlock 1, during which no object, in particular no person, was present in the spatial area 2.

Within the framework of the comparison mentioned above, the pixels of the corresponding reference depth image R can be compared with the corresponding pixels of the current depth image B received in the step 190 from the same 3D image sensor 8a and 8b, respectively, with respect to their pixel value (gray scale value). In particular, the transformation can be defined in such a way that pixels having the pixel coordinates (i; j), for which the pixel value $B_{ij}$ of the current depth image matches the corresponding pixel value $R_{ij}$ of the corresponding reference depth image at least within a predetermined tolerance range (allowed gray scale value difference), are set to an extreme value, in particular a minimum gray scale value, e.g., "0" in the resulting evaluation depth image A. This can be expressed as follows:

1. $A_{i,j} \equiv \text{MAX}(B_{i,j}, R_{i,j})$, if $BK_{i,j} > R_{i,j}$.

2. $A_{i,j} \equiv 0$ otherwise

As a result of this, the areas of the image in the current depth image which depict one or more objects detected in the spatial area 2 by the corresponding 3D image sensor 8a and 8b, respectively, in particular one or more persons P or P1 and P2, are then set apart in relation to the image background determined by the extreme value, and are thus particularly easy to identify on the basis of the corresponding gray scale value differences, which facilitates the further evaluation of the evaluation depth image A and which makes the evaluation more robust overall (cf. example gray scale value depth images in FIGS. 4A and 4B).

Now, the actual monitoring of the separation begins with step 210, in which first, for each of the evaluation depth images A, an associated characteristic depth image value $TW_a$ and $TW_b$, respectively, is determined by arithmetic averaging over all of the pixel values (gray scale values) or a selection of the pixel values (gray scale values) of the respective depth image. Optionally, an image value threshold $G_{min}$ can be used as an additional filter with this, so that only those pixel values $A_{ij}$ of the evaluation image A are included in the averaging, which have a pixel value (gray scale value) $A_{ij} > G_{min} > 0$. In this way, it is possible to set, by the image value threshold $G_{min}$, which pixels are included in the further evaluation. In particular, in this way, the pixels which are associated with the image background with $(A_{ij} = 0)$ are excluded from the averaging in the present example. Furthermore, the at least one subset can optionally be additionally determined as a function of the respective spatial position of the pixels in the respective depth image, so that pixels in the vicinity of the edge of the evaluation image can be excluded, for example.

The forming of an average can be expressed, in the simple case of averaging over all pixels, as follows, where W and H represent the number of pixels in the two lateral dimensions (width, length) of the respective evaluation depth image A:

$$TW \equiv \frac{\sum_{i=1}^{W} \sum_{j=1}^{H} A_{i,j}}{W \cdot H}$$

Then, in the step 220, the depth image values $TW_a$ and $TW_b$, which have been determined, are combined to form a total image value G in accordance with a predetermined combination rule, which, in the present example, corresponds to a simple addition $G = TW_a + TW_b$.

On the basis of the total image value G determined in this way, an estimated value E for the probability of there being more than one person present in the personnel interlock is now determined by a comparison of the total image value with one or, as in the present example, several predetermined reference total image values $G_1$, $G_2$. In particular, the reference total image values $G_1$, $G_2$ may be determined such that $G_1$ indicates a minimum probability, in particular 0%, and $G_2$ indicates a maximum probability, in particular 100%. The comparison can then be carried out in accordance with the following relationship in order to determine the estimated value E (in [%]) within a range of probabilities of between 0% and 100%:

$$E \equiv \text{MIN}(100, \text{MAX}(0, ((G - G1)/(G2 - G1)) \times 100))$$

In the step 240, this estimated value can now be compared with a predetermined threshold value S in order to determine, in dependence upon the result of this comparison, either (240—no) that there is only a single person P in the personnel interlock 1 (250) or, conversely (240—yes), that there are a plurality of persons P1, P2 in the personnel interlock 1 (290). In the latter case 290, an alarm notification is triggered, for example to security personnel assigned to the personnel interlock 1, in order to indicate that a (prohibited) attempt has taken place by a plurality of persons P1, P2 to pass through the personnel interlock at the same time.

In the case 250, on the other hand, the authentication is activated in the step 260 by the monitoring system 13 by corresponding controlling of the authentication device 8a associated with the direction of passage 6a. If the subsequent authentication is successful (270—yes), the control process is completed in the step 280 by opening the pair of doors 5 on the exit side by a corresponding control activity by the monitoring system 13.

Otherwise (270—no), in the step 310, a user communication, in particular a visual display and/or acoustic signaling, is issued at the corresponding authentication device 8a, which indicates the failed authentication and thus the denial of the access secured by the personnel interlock 1. In addition, further signaling, for example to monitoring personnel, may be output. Furthermore, in the step 320, the pair of doors 4 on the entrance side is opened by a corresponding control activity by the monitoring system 13 in order to enable the person P to leave the personnel interlock 1.

While at least one example embodiment has been described above, it is to be noted that a large number of variations thereto exist. In this context it is also to be noted that the example embodiments described herein only illustrate non-limiting examples, and that they are not intended thereby to limit the scope, the applicability, or the configuration of the devices and methods described herein. Rather, the preceding description will provide the person skilled in the art with instructions for the implementation of at least one example embodiment, whereby it is to be understood that various changes in the functionality and the arrangement of the elements described in an example embodiment can be made without thereby deviating from the subject matter respectively set forth in the appended claims as well as legal equivalents to this.

What is claimed is:

1. A method of monitoring a spatial area in a personnel interlock and for monitoring of a separation of persons with respect to the spatial area, the method comprising:
receiving image data which represent a plurality of depth images of the spatial area which have been acquired simultaneously and from different positions in an area of the personnel interlock, in each case by a respective 3D image sensor arranged at the different positions, wherein each of the depth images indicates, for each of its pixels, a spatial distance of an object or portion thereof imaged thereon from the associated 3D image sensor on a basis of a pixel value assigned thereto;

calculating, for each of the depth images, a characteristic depth image value associated with the respective depth image, on a basis of all of the individual pixel values or on a basis of a subset of the individual pixel values of the respective depth image;

calculating a total image value by combining the characteristic depth image values of the various depth images in accordance with a predetermined monotonic combination rule;

determining an estimation result for a probability that more than one person is present in the spatial area, in dependence upon a result of a comparison of the total image value with at least one predetermined reference total image value, wherein the estimation result is a percentage within a range of probabilities between 0% and 100% to define a quantitative measure of the probability that more than one person is present in the spatial area; and comparing the estimation result to a predetermined threshold value to determine whether there is only a single person in the spatial area or there are multiple persons in the spatial area, wherein:

the step of calculating the characteristic depth image value is performed using averaging of the individual pixel values to calculate an average value that is set as the characteristic depth image value associated with the respective depth image;

the step of calculating the total image value is performed by summation or multiplication of the characteristic depth image values such that the total image value is always greater than or equal to each of the characteristic depth image values summed or multiplied using the monotonic combination rule; and during the step of determining the estimation result, the comparison of the total image value with the at least one predetermined reference total image value is performed by a mathematical calculation that determines both (a) whether these compared values differ from one another, and (b) a measure of how much the compared values differ from one another when unequal.

2. The method in accordance with claim 1, further comprising:
triggering of a functionality of the personnel interlock in dependence upon the estimation result.

3. The method in accordance with claim 1, wherein the personnel interlock can be operated as a bidirectional passage interlock and the steps of the method is applied for each of two directions of passage.

4. The method in accordance with claim 1, wherein the spatial area of the personnel interlock can be closed off at least on one side by a movable restriction of passage, and the method further comprises:
determining the distance of an object located in the spatial area on a basis of at least one of the depth images, and
triggering an opening or a closing of the restriction of passage as a function of the distance that has been determined.

5. The method in accordance with claim 1, further comprising:
carrying out an image transformation with respect to at least one of the depth images prior to a calculation of its respective characteristic depth image value, wherein the respective depth image is combined with a reference depth image within a framework of the image transformation in accordance with a predetermined transformation rule, by means of which image areas in the respective depth image with respect to which image areas the respective depth image and the reference image match with respect to their respective mutually corresponding pixel values are contrasted, by a predetermined modification of their associated image values, from other areas of the image in which there is no such match.

6. The method in accordance with claim 1, wherein when the characteristic depth image values are being calculated, the depth image value of at least one of the depth images is calculated on a basis of a subset of the individual pixel values of that depth image, wherein the pixels of the subsets are selected on a basis of their respective pixel value in such a way that all of these pixels each have a pixel value which is beyond a predetermined pixel value threshold or which is within a predetermined pixel value range.

7. The method in accordance with claim 6, wherein the at least one subset is additionally determined as a function of the respective spatial position of the pixels in the respective depth image.

8. A monitoring system for monitoring a spatial area in a personnel interlock and for monitoring of separation of persons, wherein the system is programmed, with respect to the personnel interlock, to perform a method that comprises:
receiving image data which represent a plurality of depth images of the spatial area which have been acquired simultaneously and from different positions in an area of the personnel interlock, in each case by a respective 3D image sensor arranged at the different positions, wherein each of the depth images indicates, for each of its pixels, a spatial distance of an object or portion thereof imaged thereon from the associated 3D image sensor on a basis of a pixel value assigned thereto;

calculating, for each of the depth images, a characteristic depth image value associated with the respective depth image, on a basis of all of the individual pixel values or on a basis of a subset of the individual pixel values of the respective depth image;

calculating a total image value by combining the characteristic depth image values of the various depth images in accordance with a predetermined monotonic combination rule;

determining an estimation result for a probability that more than one person is present in the spatial area, in dependence upon a result of a comparison of the total image value with at least one predetermined reference total image value, wherein the estimation result is a percentage within a range of probabilities between 0% and 100% to define a quantitative measure of the probability that more than one person is present in the spatial area; and comparing the estimation result to a predetermined threshold value to determine whether there is only a single person in the spatial area or there are multiple persons in the spatial area, wherein, in the method that the monitoring system is programmed to perform:

the step of calculating the characteristic depth image value is performed using averaging of the individual pixel values to calculate an average value that is set as the characteristic depth image value associated with the respective depth image;

the step of calculating the total image value is performed by summation or multiplication of the characteristic depth image values such that the total image value is always greater than or equal to each of the characteristic depth image values summed or multiplied using the monotonic combination rule; and during the step of determining the estimation result, the comparison of the total image value with the at least one predetermined reference total image value is performed by a mathematical calculation that determines both (a) whether these compared values differ from one another, and (b) a measure of how much the compared values differ from one another when unequal.

9. A personnel interlock, comprising:

the monitoring system in accordance with claim 8, for monitoring a spatial area of the personnel interlock and for monitoring of separation of persons; and a plurality of 3D image sensors which are arranged at different positions in an area of the personnel interlock, wherein each of the 3D image sensors is set up to generate an associated depth image of the spatial area and to supply the depth image to the monitoring system, wherein the respective depth image indicates, for each of its pixels, on a basis of a pixel value assigned thereto, the distance of an object or of a portion thereof imaged thereon from the associated 3D image sensor.

10. The personnel interlock in accordance with claim 9, wherein two of the 3D image sensors are arranged to be located on sides of the spatial area which are opposite to one another, in order to capture, in an image sensor-based manner, the spatial area from central detection directions which, at least substantially, run in opposite directions to one another.

11. The personnel interlock in accordance with claim 10, wherein the two 3D image sensors which are located opposite to one another are arranged with respect to the spatial area such that a projection of their central detection directions onto a defined virtual plane which extends horizontally with respect to the personnel interlock intersects a direction of passage which is projected onto a same plane and which is defined by a geometry of the personnel interlock at an angle which is different from zero, so that each of the central detection directions of the two 3D image sensors extends obliquely with respect to the direction of passage.

12. The personnel interlock in accordance with claim 11, further comprising:

an authentication device which is accessible only via the spatial area, for authenticating a person present in the personnel interlock;

wherein the authentication device comprises a user interface having a distinguished main direction of interaction for interaction between the user interface and a user thereof; and wherein the user interface is arranged with respect to the spatial area such that its main direction of interaction projected onto a horizontal virtual plane extends, with respect to a projection of the respective central detection direction of the two 3D image sensors which are opposite to one another, at an angle which is different from zero.

13. The personnel interlock in accordance with claim 12, wherein an arrangement of the authentication device is designed to be reconfigurable in terms of a position or orientation or both, with respect to the spatial area.

14. The personnel interlock in accordance with claim 12, wherein the authentication device is directly or indirectly attached to a baseboard in the spatial area of the personnel interlock.

15. The personnel interlock in accordance with claim 12, wherein the authentication device is arranged beyond a center of the spatial area in relation to a course of the associated direction of passage through the personnel interlock.

16. The personnel interlock in accordance with claim 9, wherein each of the 3D image sensors is arranged on an associated support structure of the personnel interlock provided laterally in a surrounding area of the spatial area.

* * * * *